Nov. 1, 1927.
B. L. GEORGE
1,647,793
FLOTATION AGENT AND METHOD OF MAKING THE SAME
Original Filed March 8, 1924
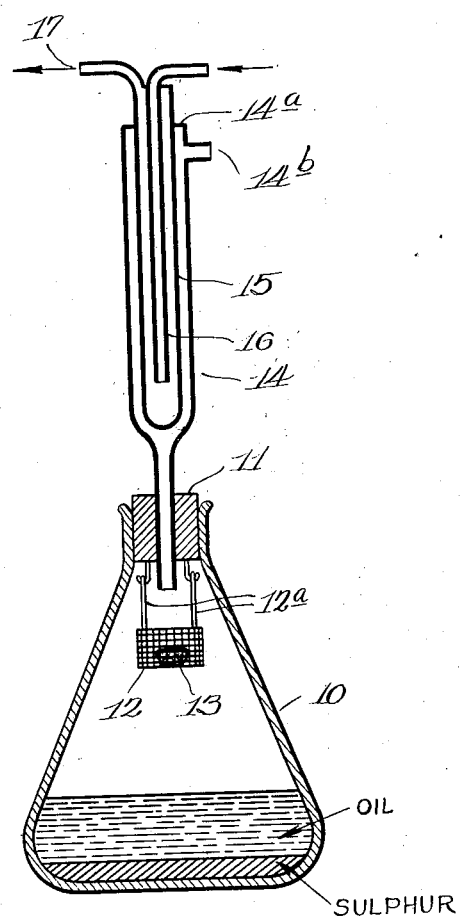
Inventor:
Barnett L. George
By Wallace R. Lane  Atty.

Patented Nov. 1, 1927.

1,647,793

UNITED STATES PATENT OFFICE.

BARNETT L. GEORGE, OF SALT LAKE CITY, UTAH.

FLOTATION AGENT AND METHOD OF MAKING THE SAME.

Original application filed March 8, 1924, Serial No. 623,642. Divided and this application filed February 2, 1925. Serial No. 6,493.

This invention relates to a modified oil and method of producing the same, and has for its principal object such a product and method especially adapted for use in the treatment of ores for recovery of the metalliferous content by flotation.

I have found that if an oil having a tar acid constituent or content is heated and has added to it, sodium or potassium hydroxide in suitable form, and if sulphur be present or added to the mixture, and the mass heated to a proper point, the oil will be so modified as to enable it to be used in flotation concentration with very satisfactory results, from the standpoint of both recovery and economy.

This application is a division of original application, Serial No. 623,642, filed March 8, 1924.

In the accompanying drawing, I have illustrated, more or less diagrammatically, a laboratory apparatus which may be utilized for the carrying out of my process and the production of my product, it being understood that this is merely one illustrative apparatus and that the method may be carried out and the product obtained on a large scale by apparatus functioning in a manner similar to that shown, such apparatus being well known to those skilled in the art, and consequently I do not contemplate being restricted to the apparatus disclosed in the accompanying drawing.

In the drawing 10 designates a flask or receptacle in which the oil is placed, this receptacle 10 being provided with a closure 11, from which depends a cage 12 by wires 12ª or the like, in which is placed sodium hydroxide 13. Extending upwardly through the closure 11 is the condenser 14, which is sealed or closed at the top 14ª through which extends downwardly into the condenser the tube 15 having a supply pipe 16 projecting downwardly therein to a point adjacent the bottom, the tube 15 being further provided with an overflow or discharge duct 17. The condenser 14 is provided with an escape 14ᵇ adjacent the top to form a discharge for hydrogen sulphide or other gases evolved in the process of reconstruction.

In the modification of oil, according to my invention, the sodium hydroxide to the desired amount, as for example .25% by weight on the oil to be reconstructed, is placed in the cage 12, the oil having previously been added to the receptacle 10. Cold water flows into the tube 15 through the inlet pipe 16 continuously discharging through the duct 17, thereby assuring a continuous flow of cold water from the bottom of tube 15 upwardly in well known manner. Heat is applied to the bottom of receptacle 10 and the oil therein heated. When the temperature reaches, for example, approximately 100° centigrade. such water as may be present in the oil is violatilized and rises into the condenser 14, wherein it will be condensed and drained back through the cage 12, dissolving the sodium hydroxide gradually and carrying the same in solution until all of the sodium hydroxide has been amalgated or carried into the oil. At this point sulphur in the form of flowers of sulphur, for example, may be added to the oil, or it may have been placed in the receptacle prior to the beginning of the operations. In either event the rise of the temperature to the proper degree (above 120° C. for example,) will result in the melting of the sulphur, which will then react or combine with the mixture of oil and sodium hydroxide resulting in the modification of the oil to render it especially adaptable for use in flotation operations.

Since it is apparent that a relatively small amount of sodium hydroxide is used, many or most oils of a commercial grade will contain sufficient water to dissolve the sodium hydroxide, if the same be added in solid form, but should such water content not be sufficient, the small amount of water necessary may be added directly to the oil. I also contemplate the application of sodium hydroxide in paste or powdered form, if I find same desirable.

As an example of the proportions of the ingredients used in the treatment of the oil, I have satisfactorily reconstructed a typical coal tar creosote by the addition of .25% sodium hydroxide by weight on the oil and approximately 5% of sulphur.

It should be recognized that when sodium hydroxide is referred to in the description and claims, that potassium hydroxide or other homologues may be utilized in lieu of the sodium hydroxide, and I do not wish to be restricted to the use of that specific ingredient in the practice of my process.

What I claim is:

1. A process of forming an agent for flotation consisting of heating an oil containing a tar acid, and adding thereto sodium hydroxide and sulphur.

2. A process of the class described, consisting in heating an oil containing a tar acid having sodium hydroxide in solution and adding sulphur thereto.

3. A process of the class described, consisting in applying sodium hydroxide to a mixture of oil and sulphur heated to a point below the melting point of said sulphur, and then heating said oil to a point above the melting point of said sulphur.

4. A process of the class described, consisting in applying sodium hydroxide in solution to a mixture of oil and sulphur heated to a point below the melting point of said sulphur, and thereafter raising the temperature of said mixture to the melting point of said sulphur.

5. A process of the class described, consisting in heating a mixture of sulphur and oil and a small amount of water in a receptacle having sodium hydroxide suspended therein above the mixture to a temperature below the melting point of sulphur and above the boiling point of said water to vaporize the water, thereafter condensing the water and applying it to said sodium hydroxide to dissolve and carry said sodium hydroxide to said oil and sulphur mixture, and thereafter raising the temperature of said mixture above the melting point of said sulphur.

6. An agent for use in flotation processes comprising the resultant product of the heating of an oil containing a tar acid mixed with sodium hydroxide and sulphur whereby such product emulsifies more readily in water than the original oil and possesses increased selectivity toward metalliferous matter over that possessed by the original oil.

In witness whereof, I hereunto subscribe my name to this specification.

BARNETT L. GEORGE.